UNITED STATES PATENT OFFICE.

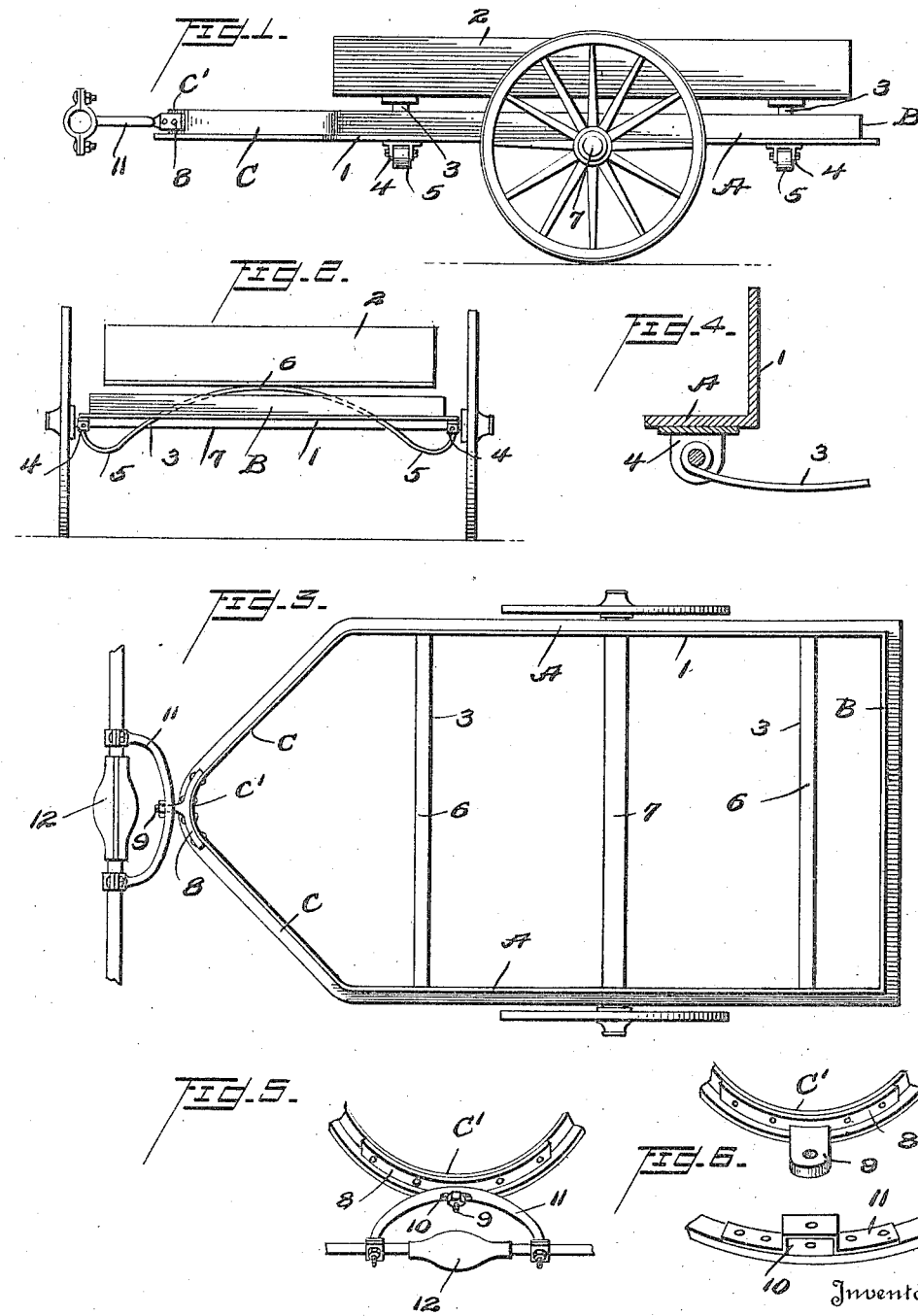

WILLIAM T. SHAVER, OF DES MOINES, IOWA.

VEHICLE-TRAILER.

1,234,224. Specification of Letters Patent. Patented July 24, 1917.

Application filed August 8, 1916. Serial No. 113,749.

*To all whom it may concern:*

Be it known that I, WILLIAM T. SHAVER, a citizen of the United States, and a resident of Des Moines, in the county of Polk and State of Iowa, have invented new and useful Improvements in Vehicle-Trailers, of which the following is a specification.

My invention relates to trailing carts for automobiles or other vehicles.

The object of my invention is to produce a trailer of the character described having a main frame formed of a single piece of angle iron, the fore end of which is bent to form an angle at the apex of which is provided a suitable coupling for connecting same with the draft vehicle. A further object thereof is to produce suitable compound-curved springs carried at their ends on the longitudinal sides of said frame for supporting the body mounted thereon. Another object thereof is to produce a coupling for said trailer attached to the fore part of the frame for connectiong same with the draft vehicle and permitting a latitude of motion to compensate for further irregularities of travel, and a still further object of my invention is to produce a more simple, cheap and efficient trailer of said character than has heretofore been attained.

To these ends, my invention includes the combination and arrangement of component parts to be hereinafter described and more particularly pointed out in the claim.

In the accompanying drawings in which like reference characters indicate similar parts, Figure 1 is a side elevation of my vehicle trailer;

Fig. 2 is a rear elevation;

Fig. 3 is a plan view with the body removed;

Fig. 4 is a detail sectional view of the frame showing the means of attaching the springs, and Fig. 5 is a detail perspective view of the coupling for attaching my trailer to a draft vehicle.

Fig. 6 is a modified form of my coupling.

Referring now to the drawings, 1 designates a frame formed preferably of an integral piece of angle iron, and comprising the longitudinal or side members A, the rear members B connecting the side members, and the fore member C, which, as shown, is bent forward into triangular shape having the rounded apex C' and legs C''.

At the end C' is attached a reinforcing T-iron which forms a portion of the coupling to be hereinafter described.

The body 2 is carried upon the cross springs 3, which, as shown, are secured at their ends to the under face of the side members of the frame 1 by the brackets 4. Said springs are formed in compound curves, being curved downwardly at 5 adjacent to their ends and then turned upwardly to form the arch 6 on which the body is secured. It will be appreciated that such construction of the springs will allow the shortening or lengthening under the varied pressure of the load thereon.

The frame 1 is mounted on one or more cross axles 7, suitably secured thereon by clips.

As before stated, the T-iron 8 is bolted to the fore end of the frame 1, the projecting member of which is pierced to receive the pin 9 to secure same in a slot 10 in the yoke 11 intermediate of its ends. Said yoke, as shown, is secured at its ends to the rear axle 12 of the draft vehicle.

The latitude of lateral motion provided by the horizontal slot 10 in which the stud of the T-iron 8 is carried permits the necessary oscillation of the trailer in traveling the irregularities of the road.

Having thus described my invention, what I claim as new and desire to be secured by Letters Patent, is—

The combination with a vehicle trailer comprising a frame of angle iron having a forwardly-extending front portion, springs and a body supported thereon, an axle and wheels supporting said frame, of a T-iron secured on the fore part of said frame, a forwardly projecting stud thereon and a yoke adapted to be secured on the rear axle of a draft vehicle having a slot therein intermediate of its ends adapted to receive the stud and loosely attach same to the draft vehicle, substantially as described.

WILLIAM T. SHAVER.

Copies of this patent may be obtained for five cents each, by addressing the "Commissioner of Patents, Washington, D. C."